(12) United States Patent
Perez et al.

(10) Patent No.: US 12,124,814 B2
(45) Date of Patent: Oct. 22, 2024

(54) SELF-ATTENTION-BASED CONFIDENCE ESTIMATION OF LANGUAGE MODELS

(71) Applicant: NAVER CORPORATION, Gyeonggi-do (KR)

(72) Inventors: Julien Perez, Grenoble (FR); Denys Proux, Vif (FR); Michael Niemaz, Saint Pierre d'Allevard (FR)

(73) Assignee: NAVER CORPORATION, Gyeonggi-Do (KR)

( * ) Notice: Subject to any disclaimer, the term of this patent is extended or adjusted under 35 U.S.C. 154(b) by 207 days.

(21) Appl. No.: 17/720,912

(22) Filed: Apr. 14, 2022

(65) Prior Publication Data
US 2023/0334267 A1    Oct. 19, 2023

(51) Int. Cl.
| | |
|---|---|
| *G06F 16/9032* | (2019.01) |
| *G06F 16/332* | (2019.01) |
| *G06F 40/30* | (2020.01) |
| *G06F 40/58* | (2020.01) |
| *G06N 3/042* | (2023.01) |
| *G06N 3/0455* | (2023.01) |
| *G06N 3/0464* | (2023.01) |

(Continued)

(52) U.S. Cl.
CPC ........ *G06F 40/58* (2020.01); *G06F 16/90332* (2019.01); *G06N 3/10* (2013.01)

(58) Field of Classification Search
CPC ........ G06F 40/58; G06F 40/30; G06F 40/284; G06F 40/295; G06F 40/216; G06F 40/40; G06F 40/35; G06F 40/44; G06F 16/90332; G06F 16/9032; G06F 16/3329; G06F 16/332; G06F 16/35; G10L 15/16; G10L 15/063; G10L 15/22; G10L 15/02; G10L 15/08; G10L 15/28; G06N 3/08; G06N 3/04; G06N 3/045; G06N 3/0455; G06N 3/10; G06N 3/042; G06N 3/0895; G06N 20/00
USPC ........................................ 704/1–9
See application file for complete search history.

(56) References Cited

U.S. PATENT DOCUMENTS

2022/0270597 A1*    8/2022    Qiu .................. G10L 15/22

OTHER PUBLICATIONS

Li et al "Confidence Estimation for Attention-Based Sequence-To-Sequence Moels for Speech Recognition", ICASSP 2021, IEEE International Conference on Acoustics, Speech and Signal Processing ICASSP, pp. 6388-6392, (Year: 2021).*

(Continued)

*Primary Examiner* — Leshui Zhang

(57) ABSTRACT

A confidence estimation system includes: a neural network including at least one an attention module including N heads configured to: generate attention matrices based on interactions between tokens for words in an input sequence of words, the input sequence of words including a word that is obscured; and determine the word that is obscured in the input sequence; and a confidence module configured to determine a confidence value indicative of a probability of the neural network correctly determining the word that is obscured, the confidence module determining the confidence value of the word that is obscured using a convolutional neural network that projects the attention matrices generated by the attention module over a multi-dimensional space, the attention matrices recording interactions between the tokens in the input sequence of words without information regarding the tokens for the words and the word that is obscured.

20 Claims, 7 Drawing Sheets

(51) Int. Cl.
    G06N 3/0895    (2023.01)
    G06N 3/10      (2006.01)

(56) References Cited

OTHER PUBLICATIONS

Qiu et al, Learning Word-Level Confidence for Subword End-To-End ASR, ICASSP IEEE International Conference on Acoustics, Speech and Signal Processing ICASSP, pp. 6393-6397 (Year: 2021).*
Evermann, et al "Large Vocabulary Decoding and Confidence Estimation Using Word Posterior Probabilities", Proc. ICASSP, Istanbul, pp. 1655-1658 (Year: 2000).*
Kano et al "Attention-Based Multi-Hypothesis Fusion for Speech Summarization", IEEE Automatic Speech Recognition and Understanding Worshop ASRU, IEEE, pp. 487-494 (Year: 2021).*
Abdalghani Abujabal, Rishiraj Saha Roy, Mohamed Yahya, and Gerhard Weikum. 2019. ComQA: A community-sourced dataset for complex factoid question answering with paraphrase clusters. In Proceedings of the 2019 Conference of the North American Chapter of the Association for Computational Linguistics: Human Language Technologies, vol. 1 (Long and Short Papers), pp. 307-317, Minneapolis, Minnesota. Association for Computational Linguistics.
Alex Wang, Amanpreet Singh, Julian Michael, Felix Hill, Omer Levy, and Samuel R. Bowman. 2018. Glue: A Multi-Task Benchmark and Analysis Platform for Natural Language Understanding. ArXiv, abs/1804.07461.
Alex Wang, Yada Pruksachatkun, Nikita Nangia, Aman-preet Singh, Julian Michael, Felix Hill, Omer Levy, and Samuel R. Bowman. 2019. Superglue: A stickier benchmark for general-purpose language understanding systems. In NeurIPS.
Alon Talmor and Jonathan Berant. 2018. The web as a knowledge-base for answering complex questions. In Proceedings of the 2018 Conference of the North American Chapter of the Association for Computational Linguistics: Human Language Technologies, vol. 1 (Long Papers), pp. 641-651, New Orleans, Louisiana. Association for Computational Linguistics.
Alon Talmor, Mor Geva, Jonathan Berant. Evaluating Semantic Parsing against a Simple Web-based Question Answering Model. 2017. https://arxiv.org/abs/1707.04412.
Alon Talmor, Oyvind Tafjord, Peter Clark, Yoav Goldberg, Jonathan Berant. Leap-Of-Thought: Teaching Pre-Trained Models to Systematically Reason Over Implicit Knowledge. 2020. https://arxiv.org/abs/2006.06609.
Anne Lauscher, Olga Majewska, Leonardo F.R. Riberiro, Iryna Gurevych, Nikolai Rozanov, Goran Glavas. Common Sense or World Knowledge? Investigating Adapter-Based Knowledge Injection into Pretrained Transformers. 2020. https://arxiv.org/abs/2005.11787.
Antoine Bordes, Nicolas Usunier, Alberto García-Durán, J. Weston, and Oksana Yakhnenko. 2013. Translating embeddings for modeling multi-relational data. In NIPS.
Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In Guyon, I.; von Luxburg, U.; Bengio, S.; Wallach, H. M.; Fergus, R.; Vishwanathan, S.V. N.; and Garnett, R., eds., Advances in Neural Information Processing Systems 30: Annual Conference on Neural Information Processing Systems 2017, Dec. 4-9, 2017, Long Beach, CA, USA, pp. 5998-6008. Curran Associates, Inc., 2017.
BFMTV, Mar. 2021, Philippe Corbé: https://fr.wikipedia.org/wiki/Philippe_Corb%C3%A9.
Chenguang Wang, Xiao Liu, and Dawn Song. 2020. Language models are open knowledge graphs. ArXiv, abs/2010.11967.
Corina Gurau, Alex Bewley, Ingmar Posner. 2018. Dropout Distillation for Efficiently Estimating Model Confidence. ArXiv, abs/1809.10562.
Fabio Petroni, Tim Rocktäschel, Patrick Lewis, A. Bakhtin, Yuxiang Wu, Alexander H. Miller, and S. Riedel. 2019. Language models as knowledge bases? In EMNLP. https://arxiv.org/abs/1909.01066.

Fever.ai. 2021 Shared Task: Fact Checking Challenge: https://fever.ai/task.html.
Giovanni Da San Martino, A. Barr'on-Cedeno, Henning Wachsmuth, R. Petrov, and Preslav Nakov. 2020. Semeval-2020 task 11: Detection of propaganda techniques in news articles. In SEMEVAL. https://aclanthology.org/2020.semeval-1.186.pdf.
Jacob Devlin, Ming-Wei Chang, Kenton Lee, and Kristina Toutanova. 2019b. BERT: Pre-training of Deep Bidirectional Transformers for Language Understanding. In Proceedings of the 2019 Conference of the North American Chapter of the Association for Computational Linguistics: Human Language Technologies, vol. 1 (Long and Short Papers), pp. 4171-4186. Association for Computational Linguistics.
Jianfeng He, Xuchao Zhang, Shuo Lei, Zhiqian Chen, Fanglan Chen, Abdulaziz Alhamadani, Bei Xiao, and Chang-Tien Lu. 2020. Towards more accurate uncertainty estimation in text classification. In EMNLP.
Jonas Pfeiffer, Andreas Ruckle, Clifton Poth, Aishwarya Kamath, Ivan Vulic, Sebastian Ruder, Kyunghyun Cho, Iryna Gurevych. AdapterHub: A Framework for Adapting Transformers. 2020. https://arxiv.org/abs/2007.07779.
Julien Perez, Denys Proux, Michael Niemaz: Self-attention-based confidence estimation of language models to assess their reliability as knowledge bases. Association for the Advancement of Artificial Intelligence 2022.
Kai Han, Yunhe Wang, Hanting Chen, Xinghao Chen, Jianyuan Guo, Zhenhua Liu, Yehui Tang, An Xiao, Chunjing Xu, Yixing Xu, Zhaohui Yang, Yiman Zhang, and D. Tao. 2020. A survey on visual transformer. ArXiv, abs/2012.12556.
Kaiming He, Xiangyu Zhang, Shaoqing Ren, and Jian Sun. 2015. Delving deep into rectifiers: Surpassing human-level performance on ImageNet classification. In IEEE Conference on Computer Vision and Pattern Recognition, CVPR, pp. 1026-1034.
Laurens van der Maaten and Geoffrey E. Hinton. 2008. Visualizing data using t-sne. Journal of Machine Learning Research, 9:2579-2605.
Lixin Su, Jiafeng Guo, Yicing Fan, Yanyan Lan, Xueqi Cheng, Controlling Risk of Web Question Answering, In Proceedings of the 42nd International ACM SIGIR Conference on Research and Development in Information Retrieval, SIGIR'19, p. 115-124, New York, NY, USA. Association for Computing Machinery, 2019. https://arxiv.org/abs/1905.10077.
Marina Fomicheva; Shuo Sun; Lisa Yankovskaya; Frederic Blain; Francisco Guzman; Mark Fishel; Nikolas Aletras; Vishrav Chaudhary; and Lucia Specia. 2020. Unsupervised Quality Estimation for Neural Machine Translation. Transactions of the Association for Computational Linguistics, 8: 539-555.
Matan Hasson and Jonathan Berant. 2021. Question decomposition with dependency graphs. ArXiv, abs/2104.08647.
Maximilian Nickel, K. Murphy, Volker Tresp, and E. Gabrilovich. 2016. A review of relational machine learning for knowledge graphs. Proceedings of the IEEE, 104:11-33.
Mehdi Mirzapour, Jean-Philippe Prost, and Christian Retoré. 2018. Measuring Linguistic Complexity: Introducing a New Categorial Metric. In Symposium on Logic and Algorithms in Computational Linguistics (LACompLing 2018), vol. 860 of Studies in Computational Intelligence, pp. 95-123, Stockholm, Sweden.
Pedro Colon-Hernandez, Catherine Havasi, Jason Alonso, Matthew Huggins, Cynthia Breazeal. Combining pre-trained language models and structured knowledge.2021. https://arxiv.org/abs/2101.12294.
Phu Mon Htut, Jason Phang, Shikha Bordia, Samuel R. Bowman. 2019. Do Attention Heads in BERT Track Syntactic Dependencies? arXiv: 1911.12246.
Pranav Rajpurkar, Robin Jia, and Percy Liang. 2018. Know what you don't know: Unanswerable questions for squad. In ACL.
Qiuping Wang. 2006. Probability distribution and entropy as a measure of uncertainty. Journal of Physics A, 41:065004.
R. Ahlswede, Alexander Ahlswede, I. Althöfer, C. Deppe, and U. Tamm. 2014. The Entropy as a Measure of Uncertainty.
Rami Aly, Zhijiang Guo, Michael Schlichtfrull, James Thorne, Andreas Vlachos, Christos Christodoulopoulos, Oana Cocarascu,

(56) References Cited

OTHER PUBLICATIONS

Arpit Mittal. Feverous: Fact Extraction and VERification Over Unstructured and Structured information. 2021. https://arxiv.org/abs/2106.05707.

Rishav Chakravarti and Avirup Sil. 2021. Towards confident machine reading comprehension. ArXiv, abs/2101.07942. https://arxiv.org/abs/2101.07942.

Shrey Desai, Greg Durrett, Calibration of Pre-trained Transformers, in EMNLP, 2020. https://arxiv.org/abs/2003.07892.

Shuo Wang, Zhaopeng Tu, Shuming Shi, and Yang Liu. 2020. On the Inference Calibration of Neural Machine Translation. In ACL.

Taichi Aida and Kazuhide Yamamoto. 2019. Confidence modeling for neural machine translation. 2019 International Conference on Asian Language Processing (IALP), pp. 349-354.

Thomas Wolf, Lysandre Debut, Victor Sanh, Julien Chaumond, Clement Delangue, Anthony Moi, Pierric Cistac, Tim Rault, Rémi Louf, Morgan Funtowicz, Joe Davison, Sam Shleifer, Patrick von Platen, Clara Ma, Yacine Jernite, Julien Plu, Canwen Xu, Teven Le Scao, Sylvain Gugger, Mariama Drame, Quentin Lhoest, and Alexander M. Rush. 2020. Transformers: State-of-the-art natural language processing. In Proceedings of the 2020 Conference on Empirical Methods in Natural Language Processing: System Demonstrations, pp. 38-45, Online. Association for Computational Linguistics.

Timo Schick and Hinrich Schütze. 2021. It's not just size that matters: Small language models are also few-shot learners. In NAACL. https://arxiv.org/abs/2009.07118.

Tom Kwiatkowski, Jennimaria Palomaki, Olivia Redfield, Michael Collins, Ankur Parikh, Chris Alberti, Danielle Epstein, Illia Polosukhin, Matthew Kelcey, Jacob Devlin, Kenton Lee, Kristina N. Toutanova, Llion Jones, Ming-Wei Chang, Andrew Dai, Jakob Uszkoreit, Quoc Le, and Slav Petrov. 2019. Natural questions: a benchmark for question answering research. Transactions of the Association of Computational Linguistics.

Wenhan Xiong, Jingfei Du, William Yang Wang, and Veselin Stoyanov. 2019. Pretrained encyclopedia: Weakly supervised knowledge-pretrained language model. ArXiv, abs/1912.09637.

Wojciech Ostrowski, Arnav Arora, Pepa Atanasova and Isabelle Augenste. Fact Extraction and VERification in. Multi-Hop Fact Checking of Political Claims. 2021. https://arxiv.org/abs/2009.06401.

Xavier Glorot and Yoshua Bengio. 2010. Understanding the difficulty of training deep feedforward neural networks. In International Conference on Artificial Intelligence and Statistics, AISTATS.

Yinhan Liu, Myle Ott, Naman Goyal, Jingfei Du, Mandar Joshi, Dangi Chen, Omer Levy, M. Lewis, Luke Zettlemoyer, and Veselin Stoyanov. 2019. Roberta: A robustly optimized bert pretraining approach. ArXiv, abs/1907.11692.

Yukun Zhu, Ryan Kiros, Richard S. Zemel, Ruslan Salakhutdinov, Raquel Urtasun, Antonio Torralba and Sanja Fidler. 2015. Aligning books and movies Towards story-like visual explanations by watching movies and reading books. In 2015 IEEE International Conference on Computer Vision, ICCV 2015, Santiago, Chile, Dec. 7-13, 2015, pp. 19-27. IEEE Computer Society.

Zhenzhong Lan, Mingda Chen, Sebastian Goodman, Kevin Gimpel, Piyush Sharma, and Radu Soricut. 2020. Albert: A Lite BERT for Selfsupervised Learning of Language Representations. ArXiv, abs/1909.11942.

Zhilu Zhang, Adrian V. Dalca, and M. Sabuncu 2019. Confidence calibration for convolutional neural networks using structured dropout. ArXiv, abs/1906.09551.

* cited by examiner

SELF-ATTENTION-BASED CONFIDENCE ESTIMATION OF LANGUAGE MODELS

FIELD

The present disclosure relates to systems and methods for adaptation of models after training and, more particularly, to systems and methods for estimating confidence of language models used, for example, for fact checking or question answering.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc.

SUMMARY

In a feature, a confidence estimation system includes: a neural network including at least one an attention module including N heads configured to: generate attention matrices based on interactions between tokens for words in an input sequence of words, the input sequence of words including a word that is obscured; and determine the word that is obscured in the input sequence; and a confidence module configured to determine a confidence value indicative of a probability of the neural network correctly determining the word that is obscured, the confidence module determining the confidence value of the word that is obscured using a convolutional neural network that projects the attention matrices generated by the attention module over a multi-dimensional space, the attention matrices recording interactions between the tokens in the input sequence of words without information regarding the tokens for the words and the word that is obscured.

In further features, the attention module includes a transformer architecture configured to generate the attention matrices.

In further features, the attention matrices are input to channels, respectively, of the convolutional neural network.

In further features, the attention module is configured to determine the word that is obscured without information regarding the tokens and without input regarding a position of the obscured word in the input sequence.

In further features, the convolutional neural network is a two dimensional (2D) convolutional neural network.

In further features: the convolutional neural network is configured to project attention matrices over a two dimensional (2D) space to produce a 2D representation; and the confidence module further includes: a flattening module configured to flatten the 2D representation; and an estimation module configured to determine the confidence value based on the flattened 2D representation.

In further features, the attention module is pretrained on a text corpus.

In further features, the pretraining includes pretraining for masked language modeling.

In further features, the pretraining for masked language modeling is based on minimizing a cross-entropy loss.

In further features, the pretraining further includes pretraining for next sentence prediction.

In further features, the pretraining for next sentence prediction is based on minimizing a binary cross-entropy loss.

In further features, a transceiver is configured to: receive the input sequence of words from a computing device via a network; and transmit, to the computing device via the network, the word that is obscured and the confidence value.

In further features, the computing device is configured to at least one of: display the word that is obscured on a display; and audibly output the word that is obscured via a speaker.

In further features, the confidence module is configured to determine the confidence value based on whether the word determined by the attention module is within a top k number of words, where k is an integer greater than zero.

In further features, a training module is configured to train the attention module based on the confidence value.

In further features, the training includes selectively adjusting one or more parameter values of the attention module.

In further features, (i) the input sequence of words is a question, (ii) the word that is obscured is an answer to the question, and (iii) the probability of the attention module correctly determining the word that is obscured is a determination indicating whether the answer to the question is correct.

In a feature, a confidence estimation system includes: a neural network trained for performing a natural language processing task, the neural network including at least one an attention module including N heads configured to process an input sequence of words in accordance with the natural language processing task thereby producing an output sequence, the processing generating attention matrices based on interactions between tokens for the words in the input sequence of words; and a confidence module configured to determine a confidence value indicative of a probability of the neural network correctly performing the natural language processing task, the confidence module determining the confidence value of the natural language processing task using a convolutional neural network that projects the attention matrices generated by the attention module over a multi-dimensional space, the attention matrices recording interactions between the tokens in the input sequence of words without information regarding the tokens for the words or the output sequence.

In further features, the natural language processing task is one of: fact checking, translation, question-answering, summarization, sequence classification, sequence tagging, and text prediction.

In a feature, a confidence estimation method includes: generating attention matrices based on interactions between tokens for words in an input sequence of words, the input sequence of words including a word that is obscured; determining the word that is obscured in the input sequence;

determining a confidence value indicative of a probability of that the determination of the word that is obscured is correct; and the determining the confidence value being performed using a convolutional neural network that projects the attention matrices over a multi-dimensional space, the attention matrices recording interactions between the tokens in the input sequence of words without information regarding the tokens for the words and the word that is obscured.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Machine reading and comprehension is progressing. Fact checking and question answering are also progressing. One example of question answering is determining an obscured or removed word in a sentence.

A language model, such as a transformer based attention model, can be used as a knowledge base for question answering or fact checking. For example, the language model can be used to determine an obscured or missing word in a sentence. As another example, the language model can be used to determine whether a statement is factual or not.

According to the present disclosure, a confidence module determines a confidence value corresponding to a probability that an output of the language model is correct. The confidence module determines the confidence value based on intermediate representations (attention matrices) produced by the language model based on the input words in generating the output. The confidence can be used, for example, to train the language model or be informative to a user of a computing device regarding the accuracy of the output of the language model. Other uses are also possible.

Figure 1:
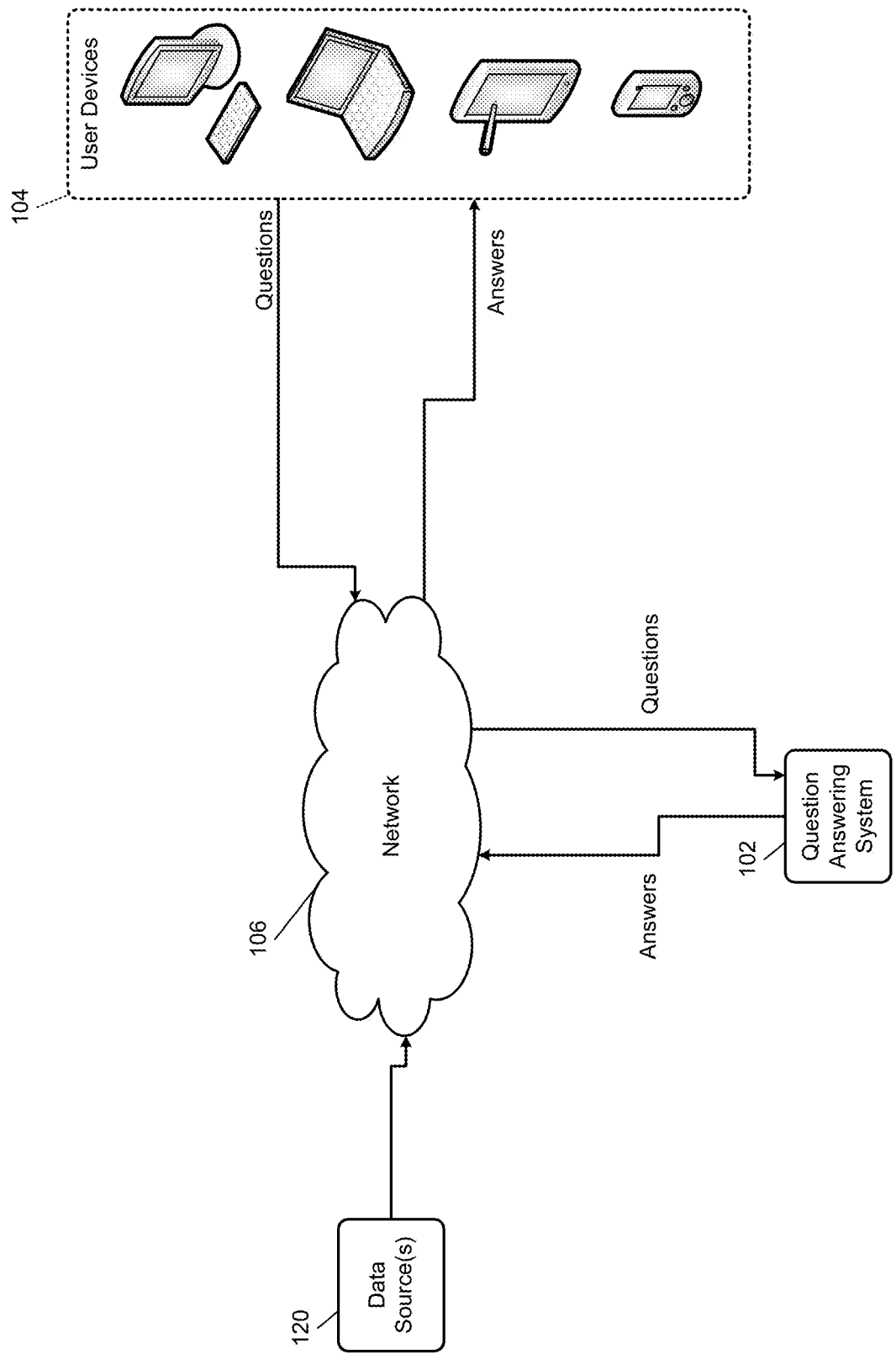
FIG. 1 includes a functional block diagram including a question answering system configured to respond to queries (e.g., including questions, respectively)

FIG. 1 includes a functional block diagram including a question answering system 102 configured to respond to queries (e.g., including questions, respectively). The question answering system 102 is configured to receive queries from one or more user computing device(s) 104 via a network 106. The question answering system 102 may determine answers to questions using bodies of text, such as text stored in memory at the question answering system 102 or elsewhere and retrieved based on the queries.

The question answering system 102 reads the bodies of text and determines answers to the questions from the bodies of text, respectively. The question answering system 102 transmits the answers back to the computing devices 104 that transmitted the questions, respectively.

The computing devices 104 may output (e.g., display or output audibly) the answers to users. The computing devices 104 may also output other information to the users. For example, the computing devices 104 may output additional information related to the bodies of text, respectively, information relevant to the answers, respectively, etc. The question answering system 102 and the computing devices 104 communicate via a network 106.

A plurality of different types of computing devices 104 are illustrated in FIG. 1. The computing devices 104 include any type of computing devices that is configured to generate and transmit questions to the question answering system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, robots, televisions, consoles (e.g., smart speakers without displays Amazon Echo, Google Home, Clova Friends mini) or other appliances (e.g., networked refrigerators, networked thermostats, etc.).

The computing devices 104 may use a variety of different operating systems. In an example where a computing device 104 is a mobile device, the computing device 104 may run an operating system including, but not limited to, Android, IOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the question answering system 102 while running operating systems other than those operating systems described above, whether presently available or developed in the future.

In some examples, a computing device 104 may communicate with the question answering system 102 using an application installed on the computing device 104. In general, a computing device 104 may communicate with the question answering system 102 using any application that can transmit questions to the question answering system 102 to be answered by the question answering system 102. In some examples, a computing device 104 may run an application that is dedicated to interfacing with the question answering system 102, such as an application dedicated to question answering. In some examples, a computing device 104 may communicate with the question answering system 102 using a more general application, such as a web-browser application. The application executed by a computing device 104 to communicate with the question answering system 102 may display a search field on a graphical user interface (GUI) in which the user may enter questions. The user may enter a question using a touchscreen or physical keyboard, a speech-to-text program, or other form of user input.

A question entered into a GUI on a computing device 104 may include words, numbers, letters, punctuation marks, and/or symbols. In general, a question may be a request for information retrieval (e.g., an answer) from the question answering system 102. For example, a question may be directed to providing an answer from a specific body of text that is responsive to the question.

A computing device 104 may receive an answer from the question answering system 102 that is responsive to the question transmitted to the question answering system 102. In various implementations, the computing device 104 may receive and the question answering system 102 may transmit more than one answer that is responsive to the question. In the example of the question answering system 102 providing multiple answers, the question answering system 102 may determine a confidence value (indicative of a likelihood of that the answer is correct) for each of the individual answers and provide the confidence values along with the answers to the computing device 104. The computing device 104 may display more than one of the multiple answers (e.g., all answers having a confidence value that is greater than a predetermined value), only the answer with the highest confidence value, etc.

The computing device 104 may be running an application including a GUI that displays the answer(s) received from the question answering system 102. The respective confidence value(s) may also be displayed. For example, the application used to transmit the question to the question answering system 102 may also present (e.g., display or speak) the received answer(s) to the user. As described above, the application that presents the received answer(s) to the user may be dedicated to interfacing with the question answering system 102 in some examples. In other examples, the application may be a more general application, such as a web-browser application.

The GUI of the application running on the computing device 104 may display the answer(s) to the user in a variety of different ways, depending on what information is transmitted to the computing device 104. In examples where the search results include a list of answers and associated confidence values, the question answering system 102 may transmit the list of answers and respective confidence values to the computing device 104. In this example, the GUI may display the answer(s) and the confidence value(s) to the user as a list of possible answers.

In some examples, the question answering system 102, or other computing system, may transmit additional information to the computing device 104 such as, but not limited to, applications and/or other information associated with the text, the question, or the answer, other bodies of text associated with the body of text, etc. This additional information may be stored in a data store and transmitted by the question answering system 102 to the computing device 104 in some examples. In examples where the computing device 104 receives the additional information, the GUI may display the additional information along with the answer(s). In some examples, the GUI may display the answers as a list of applications ordered from the top of the display to the bottom of the display by descending conference value. In some examples, the answers may be displayed under the search field in which the user entered the question.

In some examples, computing devices 104 may communicate with the question answering system 102 via a partner computing system. The partner computing system may include a computing system of a third party that may leverage the search functionality of the question answering system 102. The partner computing system may belong to a company or organization other than that which operates the question answering system 102. Example third parties which may leverage the functionality of the question answering system 102 may include, but are not limited to, internet search providers and wireless communications service providers. The computing devices 104 may send questions to the question answering system 102 via the partner computing system. The computing devices 104 may also receive answers from the question answering system 102 via the partner computing system. The partner computing system may provide a user interface to the computing devices 104 in some examples and/or modify the user experience provided on the computing devices 104.

As stated above, the computing devices 104 may transmit the body of text from which to generate the answer along with the question (for the body of text). Alternatively, the question answering system 102 may obtain the body of text from a data source 120. Bodies of text may also be referred to as text corpuses. The data sources 120 may include a variety of different text providers. The data sources 120 may include digital distribution platforms such as, but are not limited to, online news sources, websites, websites that include web logs (i.e., blogs), social networking sites (e.g., Facebook, Twitter, etc.), and/or other types of data sources (e.g., news feeds).

The computing devices 104, the question answering system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

While the example of a question answering system is provided, the present application is also applicable to fact checking systems and other types of systems. In fact checking systems, the queries include statements, and the question answering system would determine and respond with an indicator of whether the statement is true or not.

Figure 2:
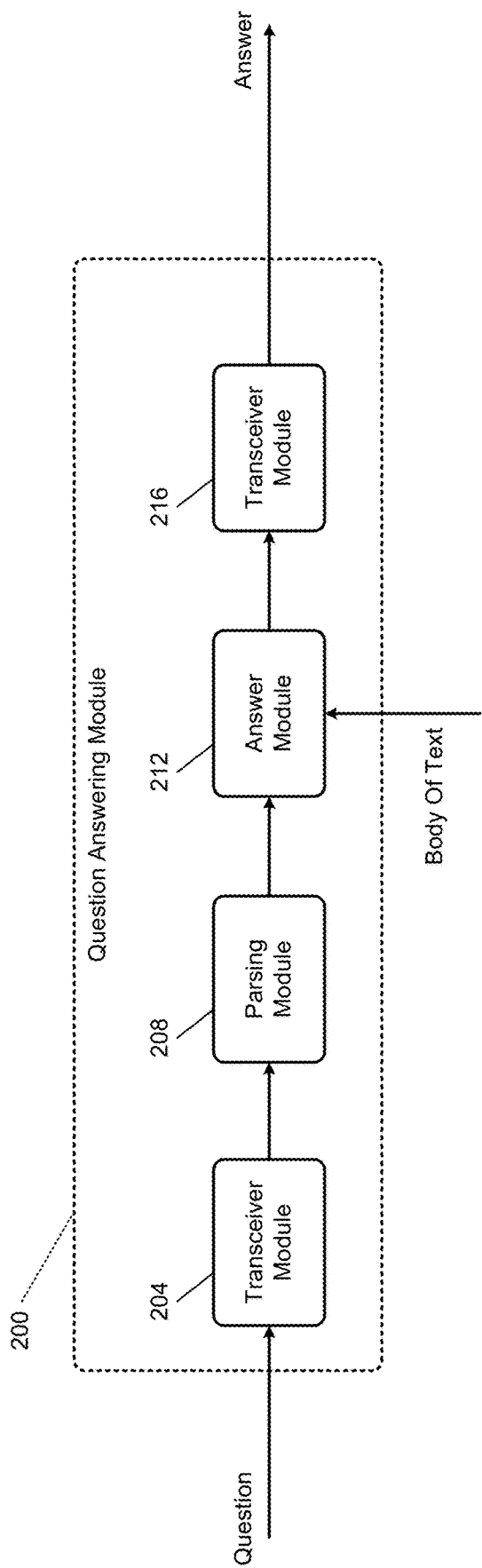
FIG. 2 is a functional block diagram including an example implementation of the question answering module of the question answering system.

FIG. 2 is a functional block diagram including an example implementation of the question answering module 200 of the question answering system 102. A first transceiver module 204 receives a query including a question from a computing device 104. The transceiver module 204 may also receive a body of text from the computing device 104 or retrieve the text from another source.

A parsing module 208 parses the query to obtain the question that is to be answered. The parsing module 208 may, for example, identify a string of one or more words forming the question to be answered. The parsing module 208 may also correct any misspelled words in the question and/or perform one or more other word processing and/or natural language processing functions on the question (e.g., morphological analysis, syntactical analysis, and query expansion).

An answer module 212 determines the answer to the question from a body of text. The body of text may be transmitted by the computing device 104 along with the question. Alternatively, the body of text may be obtained by the answer module 212 from a data source. The answer module 212 may determine the body of text to be obtained, for example, based on the question. As an example, the question may be, "how many different monster trucks are there in the book Elbow Grease?". In this example, the answer module 212 may determine that the body of text from which to generate the answer is the book Elbow Grease. The answer module 212 may obtain the text of the book Elbow Grease from a data source. In the example above, the answer module 212 may determine that question is "how many different monster trucks are there?".

The answer module 212 includes an attention module having the transformer architecture to determine the answers to the questions from bodies of text.

A second transceiver module 216 transmits the determined answer to the question back to the computing device 104. In various implementations, the second transceiver module 216 may be omitted, and the first transceiver module 204 may transmit the answer back to the computing device 104 from which the question was received.

Figure 3:
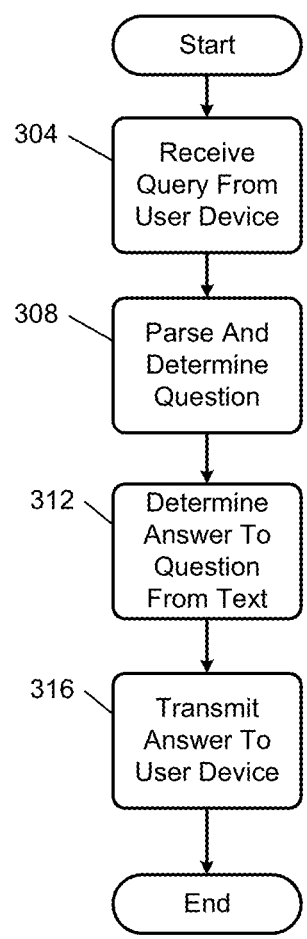
FIG. 3 includes a flowchart depicting an example method of receiving a question and providing an answer to the question.

FIG. 3 includes a flowchart depicting an example method of receiving a question and providing an answer to the question. The example of FIG. 3 may be performed by the question answering module 200.

Control begins with 304 where the question answering module 200 receives a query from a computing device 104. The query includes a question to be answered. The query may also include the body of text that is to be used as the basis for answering the question, or the body of text may be accessed by the question answering module 200. At 308, the question answering module 200 parses the query and determines the question to be answered.

At 312, the question answering module 200, using the attention module including the transformer architecture, determines the answer to the question. At 316, the question answering module 200 transmits the answer to the computing device 104 from which the query was received.

Transformer architecture as used herein is described in Ashish Vaswani, Noam Shazeer, Niki Parmar, Jakob Uszkoreit, Llion Jones, Aidan N Gomez, Łukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. Additional information regarding the transformer architecture is provided below.

More generally attention mechanisms/modules in the transformer architecture allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence, such as a question). Transformer mechanisms are one way to implement a self-attention mechanism that maps queries against a set of keys to present values, which together define an embedding matrix.

Figure 4:
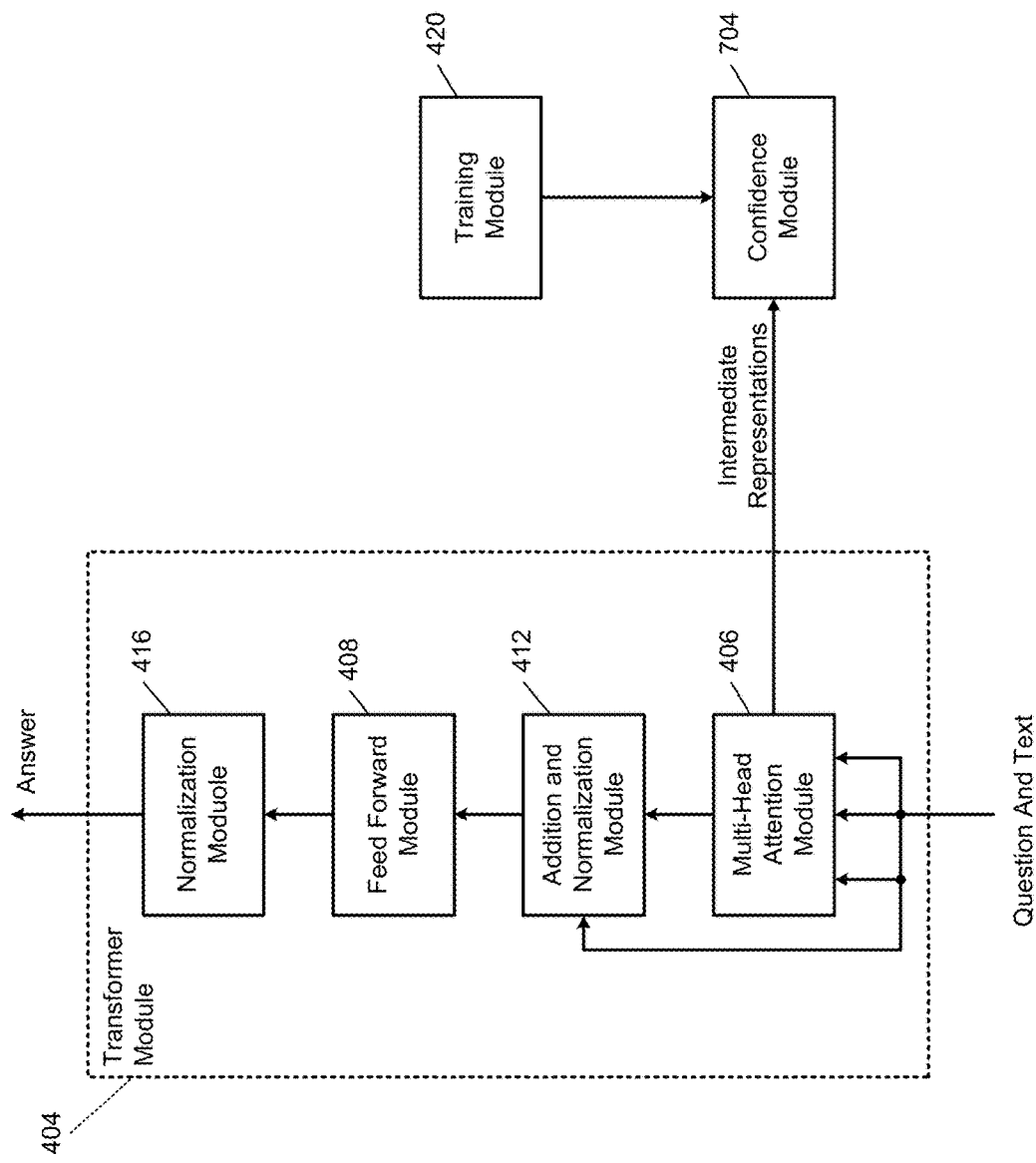
FIG. 4 is a functional block diagram of an example implementation of a transformer module of the question answering module.

FIG. 4 is a functional block diagram of an example implementation of a transformer module 404 of the question answering module 200. The transformer module 404 includes a multi-headed attention layer or module including h "heads" which are computed in parallel. Each of the heads performs three linear projections called (1) the key K, (2) the query Q, and (3) the value V. The three transformations of the set of input features (e.g., token representation of the question) are used to compute a contextualized representation of each of the inputs. The scaled-dot attention is applied on each head independently. Each head aims at learning different types of relationships among the inputs and transforming them. Then, the outputs of each layer are concatenated as head {1,h} and are linearly projected to obtain a contextualized representation of each input, merging all information independently accumulated in each head into output M. The resulting output of the transformer module 404 is the answer to the question. The transformer module 404 may be more generally referred to as an attention module.

The heads of the Transformer architecture allow for discovery of multiple relationships between the input sequences.

The transformer module 404 may include a stack of N=6 identical layers or another suitable number of layers. Each layer may have two sub-layers. The first sub-layer may include a multi-head attention mechanism (module) 406 (e.g., self-attention and/or cross-attention), and the second layer may include a position wise fully connected feed-forward network (module) 408. The feed-forward network module may include a neural network. Addition and normalization may be performed on the output of the multi-head attention module 406 by an addition and normalization module 412. Concatenation may also be performed by the addition and normalization module 412. Residual connections may be used around each of the two sub-layers, followed by layer normalization. A second normalization module 416 may be implemented to normalize the output of the feed forward module 408.

Figure 6:
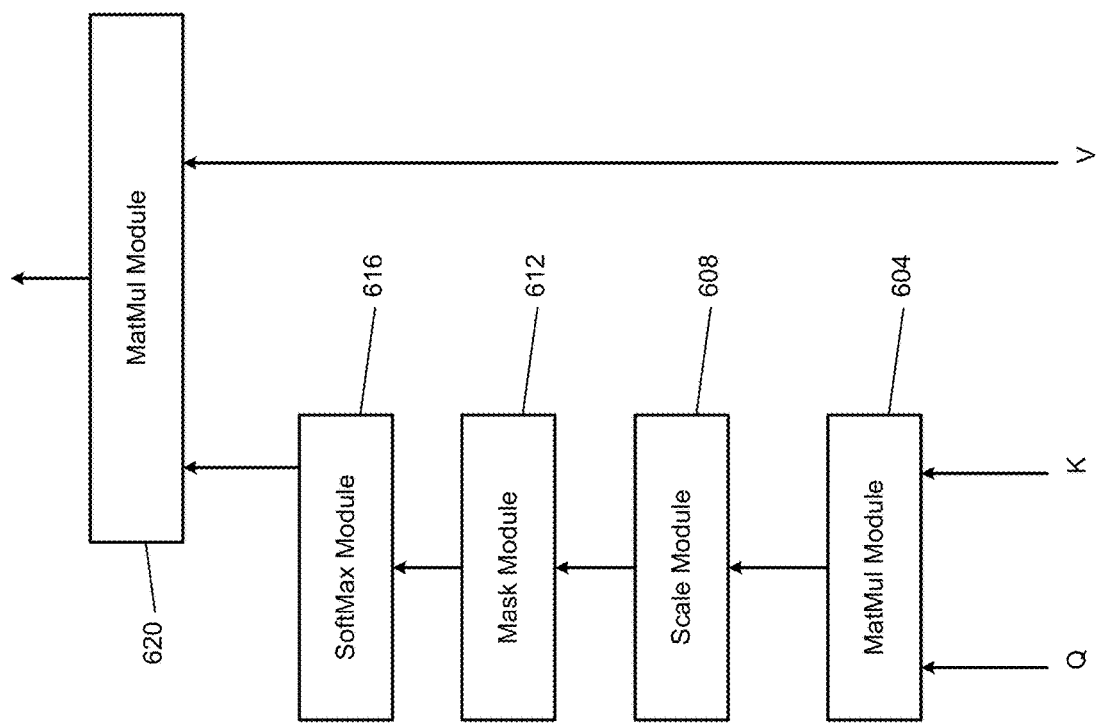
FIG. 6 includes a functional block diagram of an example implementation of a scaled dot-product attention module of the multi-head attention module.
Figure 5:
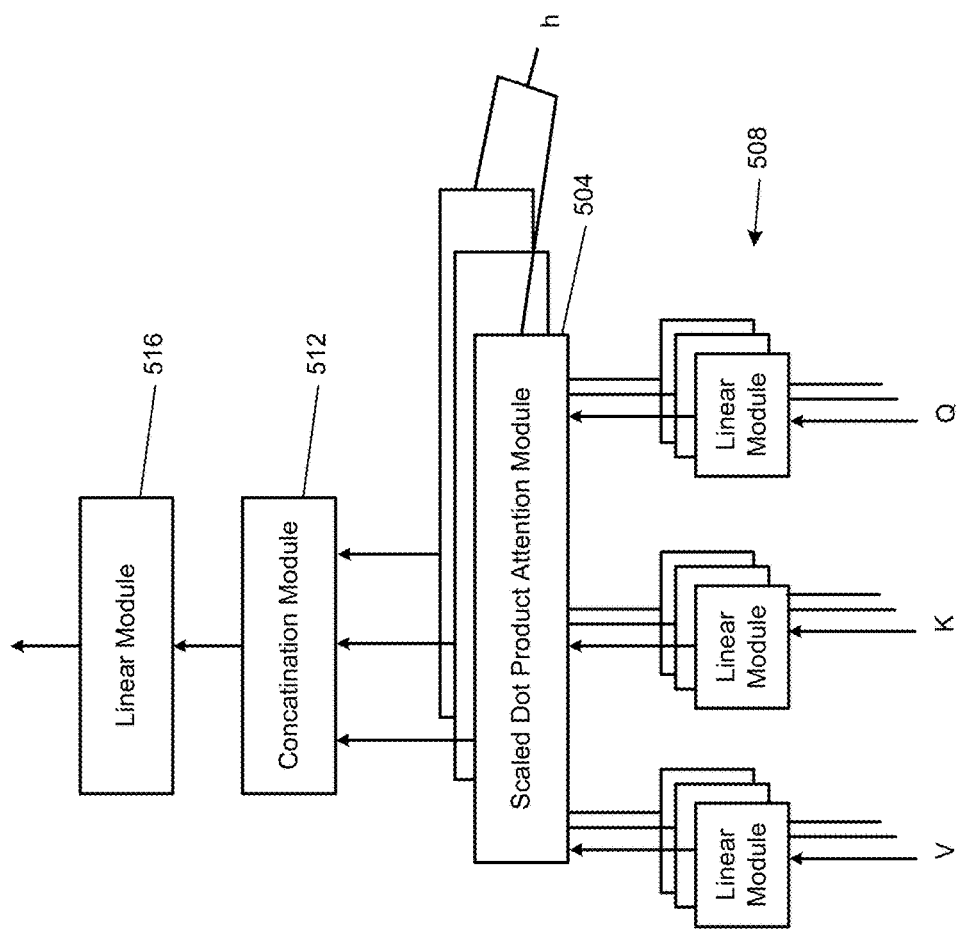
FIG. 5 includes a functional block diagram of an example implementation of a multi-head attention module.

FIG. 5 includes a functional block diagram of an example implementation of the multi-head attention module 406. FIG. 6 includes a functional block diagram of an example implementation of a scaled dot-product attention module 504 of the multi-head attention module 406.

Regarding attention (performed by the multi-head attention module 406), an attention function may map a query and a set of key-value pairs to an output, where the query, keys, values, and output are all vectors. The output may be computed as a weighted sum of the values, where the weight assigned to each value is computed by a compatibility function of the query with the corresponding key.

In the scaled dot-product attention module, the input includes queries and keys of dimension $d_k$, and values of dimension $d_v$. The scaled dot-product attention module 504 computes dot products of the query with all keys, divides each by $\sqrt{d_k}$, and applies a softmax function to obtain weights on the values.

The scaled dot-product attention module 504 may compute the attention function on a set of queries simultaneously arranged in Q. The keys and values may also be held in matrices K and V. The scaled dot-product attention module 504 may compute the matrix of outputs based on or using the equation:

$$\text{Attention}(Q, K, V) = \text{softmax}\left(\frac{QK^T}{\sqrt{d_k}}\right)V.$$

The attention function may be, for example, additive attention or dot-product (multiplicative) attention. Dot-product attention may be used in addition to scaling using a scaling factor of $$\frac{1}{\sqrt{d_k}}.$$

Additive attention computes a compatibility function using a feed-forward network with a single hidden layer. Dot-product attention may be faster and more space-efficient than additive attention.

Instead of performing a single attention function with d-dimensional keys, values and queries, the multi-head attention module 406 may linearly project the queries, keys, and values h times with different, learned linear projections to $d_k$, $d_q$ and $d_v$ dimensions, respectively, using linear modules 508. On each of the projected versions of queries, keys, and values the attention function may be performed in parallel, yielding $d_v$-dimensional output values. These may be concatenated and projected again, resulting in the final values, by a concatenation module 512 and a linear module 516 as shown. Multi-head attention may allow for jointly attention to information from different locations.

As shown in FIG. 6, a MatMul module 604 generates an output based on the query Q and key K values using the MatMul function. A scale module 608 may scale the output of the MatMul module 604 by one or more predetermined scalar values. A mask module 612 may mask one or more portions of the output of the scale module 608 to produce an output. In various implementations, the mask module 612 may be omitted.

A SoftMax module 616 may apply the softmax function to the output of the mask module 612. A MatMul module 620 generates an output to the concatenation module 512 based on the output of the SoftMax module 616 and the value V using the MatMul function. Additional information regarding the transformer architecture can be found in U.S. Pat. No. 10,452,978, which is incorporated herein in its entirety.

The transformer module 404 can be used as language models for question answering, fact checking, and other uses. While the example of a self attention based language model using the transformer architecture is provided, the present application is also applicable to other types of language models.

The transformer module 404 is used as a textual data encoder and a knowledge base. Language models may be used and specialized for downstream tasks, such as masked language modeling, next sentence prediction, question answering, fact checking, etc.

The confidence value determination described herein involves probing the intermediate (hidden) representations of tokens of the input sequence from the transformer module 404. This uses the contextualized tokens from the heads which are a by-product of reasoning by the transformer module 404. The present application involves evaluating the confidence in responses of language models without retraining, such as to minimize cost and improve speed of use.

Language modeling can be described as follows. Given a sequence of input tokens $w=[w_1, w_2, \ldots, w_N]$, a language model (e.g., the transformer module 404) assigns a probability p(w) to the sequence by using the chain-rule factorization approach, which can be described by:

$$p(w) = \prod p(w_t | w_{t-1}, w_1).$$

Probability may be estimated with the equation $$p(w_t | w_{t-1}, w_1) = \text{softmax}(Wh_t + b)$$

where $h_t \in \mathcal{R}^k$ is the output vector generated by the transformer module 404 at position t and $W \in \mathcal{R}^{|V| \times k}$ is a learned parameter matrix that maps $h_t$ to scores for every word in vocabulary V. Different language models may determine $h_t$ differently given word history. The distribution of a given word can be condition to both left and right context of the word in the sequence. Stated more formally, given the input sequence $w=[w_1, w_2, \ldots, w_N]$ and a position $1 \le i \le N$, a confidence module 704 (FIGS. 4 and 7) determines $$p(w_i) = (w_i | w_1, \ldots, w_{i-1}, w_{i+1}, \ldots, w_N)$$

using left and right context of the word (w) at location i.

The transformer module 404 may include the bidirectional encoder representation from transformers (BERT) model, which includes a multi-layer transformer encoder that is pretrained on a text corpus. The training includes two self-supervised tasks, masked language modeling and next sentence prediction. For the masked language modeling, a subset of one or more of the tokens of the input sequence is masked or corrupted, and the language model is used to predict the masked/corrupted tokens using a cross-entropy loss. As used herein, obscuring a token may include masking, corrupting, or otherwise obscuring a token. In the next sentence prediction task, the language model is trained to predict whether two sentences are continuous or not using a binary cross-entropy loss.

The transformer module 404 implements parametric transformation. The transformer module 404 produces a contextualized representation of the input sequence of tokens.

As described above, the transformer module 404 operates on the query, key, and value representations (matrices) as follows, $$Q = XW_Q,$$

$$K = XW_K, \text{ and}$$

$$V = XW_V,$$

where trained weight matrices are $W_Q$, $W_K$, $W_V \in \mathcal{R}^{d_m \times d_k}$. The self attention (Attention(Q,K,V)) is described above. The attention scoring function (Attention) is calculated by the multi-head attention module 406 using a dot-product similarity softmax $$\left(\frac{QK^T}{\sqrt{d_k}}\right)$$

which determines the interaction matrices (intermediate representations) $R^{N \times N}$. This operation determines the interactions between all of the pairs of tokens in the input sequence.

The confidence module 704 determines a confidence value for the transformer module 404 based on the intermediate representations of the heads of the transformer module 404. As such, the confidence module 704 determines the confidence value based on the encodings of the latent interactions between pairs of tokens. The confidence value is indicative of whether the transformer module 404 is functioning properly in answering the question, fact checking, etc. Lack of proper functioning can be assessed using the intermediate representations and the information in these self-attention matrices. The capability of the transformer module 404 to diffuse and contextualize the tokens of an input sequence may be correlated to the capability of the transformer module 404 to determine the masked token.

The present application involves a self-supervised approach for confidence estimation from the intermediate representations to determine the probability of success (the confidence value) of the transformer module 404 (a language model).

Figure 7:
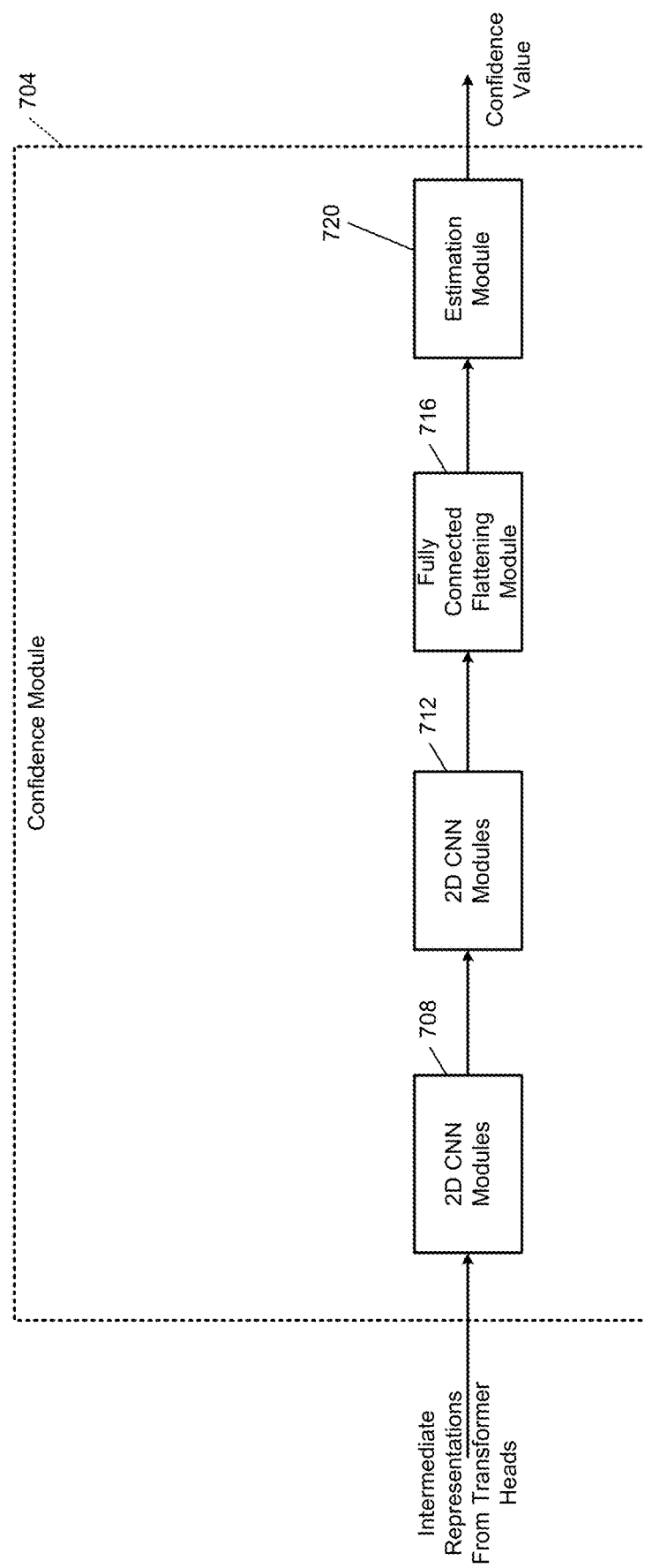
FIG. 7 is a functional block diagram of an example implementation of a confidence module.

FIG. 7 is a functional block diagram of an example implementation of the confidence module 704. The confidence module 704 includes a first stack of two dimensional (2D) convolutional neural network (CNN) modules 708 and a second stack of 2D CNN modules 712. In various implementations, the first and second stacks of 2D CNN modules may be implemented in one CNN module. While the example of 2D CNN modules is provided, the present application is also applicable other types of parametric models and other types of neural networks. The 2D CNN modules 708 and 712 receive the intermediate representations from the heads of the transformer module 404 and project the intermediate representations over a 2D space to predict the likelihood of the output of the transformer module 404 being correct. A flattening module 716 (e.g., a fully connected flattening module) flattens the 2D representation resulting from the 2D CNN modules 712. Based on the flattened output from the flattening module 716, an estimation module 720 generates an estimate value (the confidence value) of whether an output (e.g., the answer) of the transformer module 404 generated based on a query is in a set of the top-k responses to the query. The estimation module 720 generates the confidence value using one or more lookup tables and/or equations.

The confidence module 704 includes a 2D CNN stack that can be described as $f_\theta : R^{n \times m \times l} \rightarrow R^2$ wherein the attention model (of the transformer module 404) includes n layers of m heads over a sentence length of l. The confidence module 704 determines the probability that the transformer module 404 will correctly guess a masked word in an input sentence without information regarding the tokens nor the position of the masked word in the input sequence. In this way, only the interactions between the tokens are used by the confidence module 704 to determine the probability. The intermediate representations (interaction matrices) are concatenated such that each intermediate representation is an input channel of the 2D CNN stack.

Described herein are systems and methods to estimate the confidence of attention-based language models (LMs) as knowledge bases (KBs). A self-supervised approach to confidence estimation from interaction matrices based on masked LM to infer the probability of success of the LM used as a KB. Specifically, a model takes as input a set of attention matrices (Intermediate representations) produced by a pre-trained LM and it infers the probability of the LM correctly guessing a masked word placed in an input sentence. The attention matrices are concatenated through a third dimension (i.e., stacked). Each interaction matrix is an input channel to a CNN-based confidence estimation model, which estimates the probability an answer to be over the top k first ranked answers of the LM, where k is an integer greater than zero. The top k answers may be, for example, retrieved from memory.

CNNs are applied to the attention "interaction matrices", also referred to as intermediate representations, to estimate the confidence that a correct answer is in the top-k answers returned, when using a LM as a knowledge base. An example is _____ is a city in France→fill in the blank (_____), with no access to external information beyond the LM itself. More generally, a parametric model is applied to the attention matrices of a self-attention based language model used as KB to compute the probability if the answer of the masked word to be in the top-k of the output distribution over the vocabulary. This approach may be applied to other LM-encoder based tasks like sequence tagging, sequence classification, and text-generation tasks like machine translation.

A training module 420 (FIG. 4) trains the confidence module 704 using a binary cross-entropy loss or another suitable type of loss. The training module 420 trains the confidence module 704 using a training dataset including input sequences, answers, and indicators of whether the answers are correct or not. Before the training, the confidence module 704 may be pre-trained for language modeling.

Example hyperparameters of the confidence module 704 and example hyperparameters of the training of the confidence module 704 are provided below in Tables 1 and 2, respectively.

TABLE 1

Accuracy of convolutional network for error prediction @k = 10

| train/test | Bert-base-uncased | | | | Ber-large-uncased | | | |
| --- | --- | --- | --- | --- | --- | --- | --- | --- |
| | SQuAD | Google-Re | T-Rex | ConceptNet | SQuAD | Google-Re | T-Rex | ConceptNet |
| SquAD | 0.57 | 0.95 | 0.09 | 0.50 | 0.82 | 0.25 | 0.87 | 0.52 |
| Google-Re | 0.55 | 0.95 | 0.15 | 0.50 | 0.42 | 0.94 | 0.13 | 0.46 |
| T-Rex | 0.5 | 0.11 | 0.86 | 0.24 | 0.54 | 0.17 | 0.97 | 0.76 |
| ConceptNet | 0.55 | 0.95 | 0.18 | 0.58 | 0.62 | 0.08 | 0.83 | 0.84 |

TABLE 2

Model performances prediction @k = 10 by entropy thresholding on BERT-large-uncased

| Dataset/Thres. | @0.6 | @1.25 | @1.65 | Best-CNN |
| --- | --- | --- | --- | --- |
| SquAD | 0.375 | 0.342 | 0.379 | 0.82 |
| Google-Re | 0.009 | 0.036 | 0.031 | 0.94 |

TABLE 2-continued

Model performances prediction @k = 10 by entropy thresholding on BERT-large-uncased

| Dataset/Thres. | @0.6 | @1.25 | @1.65 | Best-CNN |
|---|---|---|---|---|
| T-Rex | 0.9470 | 0.7980 | 0.6980 | 0.97 |
| ConceptNet | 0.553 | 0.268 | 0.274 | 0.84 |

In various implementations, the training module 420 may further train the transformer module 404 based on the confidence values determined based on a set of input sequences input to the transformer module 404. For example, the training module 420 may train the transformer module 404 until the confidence values (e.g., an average) determined for a set of input sequences of a predetermined size is/are greater than a predetermined value. The training may include selectively adjusting one or more parameters (e.g., weight values) of the transformer module 404 based on one or more confidence values determined based on input sequences, the answers determined by the transformer module 404, and stored correct answers to the input sequences.

Described herein are systems and methods to determine confidence of an attention model based on attention matrices from the model that include information on interactions between tokens of an input sequence including one or more masked words input to the model. A 2D convolutional neural network is applied to the attention matrices for the confidence estimation. The described systems and methods provide improved information on accuracy of the attention model.

In various implementations, the confidence module 704 may be included in the question answering module 200. The question answering module 200 may transmit the confidence value to the computing device along with the answer(s). The computing device may output (e.g., display, audibly output) the confidence value along with the answer (or indicator of fact). The confidence value may be helpful to a user of the computing device as an indicator of how likely it is that the response from the question answering module 200 is correct.

Figure 8:
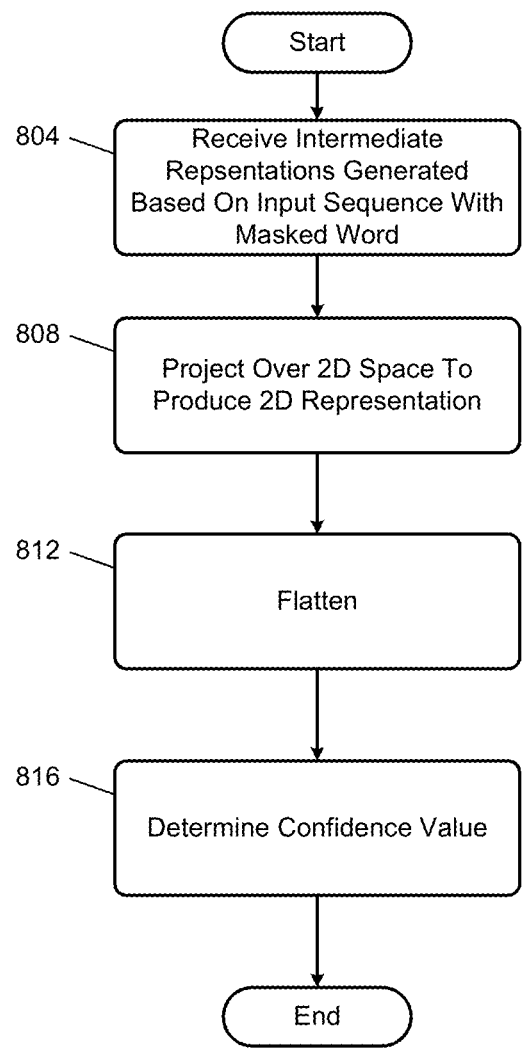
FIG. 8 is a flowchart depicting an example method of determining a confidence value in an output of a question answering or fact checking module.

FIG. 8 is a flowchart depicting an example method of determining a confidence value, such as for whether the transformer module 404 correctly determined an obscured word in an input sequence of words including the obscured word. Control begins with 804 where the confidence module 704 receives the intermediate representations (attention matrices) generated by the heads of the transformer module 404 based on the input sequence of words.

At 808, the confidence module 404 projects the intermediate representations to a 2D space to produce a 2D representation. At 812, the confidence module 704 flattens the 2D representation to produce a flattened 2D representation. At 816, the confidence module 704 determines the confidence value based on the flattened 2D representation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A confidence estimation system, comprising:
   a neural network including at least one attention module including N heads, the at least one attention module configured to:
      generate attention matrices based on interactions between tokens for words in an input sequence of words received by the neural network, the input sequence of words including a word that is obscured; and
      determine the word that is obscured in the input sequence; and
   a confidence module configured to determine a confidence value indicative of a probability of the neural network correctly determining the word that is obscured, the confidence module determining the confidence value of the word that is obscured using a convolutional neural network that projects the attention matrices generated by the at least one attention module over a multi-dimensional space, the attention matrices recording interactions between the tokens in the input sequence of words without information regarding the tokens for the words and without information regarding the word that is obscured.

2. The confidence estimation system of claim 1 wherein the at least one attention module includes a transformer architecture configured to generate the attention matrices.

3. The confidence estimation system of claim 1 wherein the attention matrices are input to channels, respectively, of the convolutional neural network.

4. The confidence estimation system of claim 1 wherein the at least one attention module is configured to determine the word that is obscured without information regarding the tokens and without input regarding a position of the obscured word in the input sequence.

5. The confidence estimation system of claim 1 wherein the convolutional neural network is a two dimensional (2D) convolutional neural network.

6. The confidence estimation system of claim 1 wherein:
   the convolutional neural network is configured to project attention matrices over a two dimensional (2D) space to produce a 2D representation; and
   the confidence module further includes:
      a flattening module configured to flatten the 2D representation; and
      an estimation module configured to determine the confidence value based on the flattened 2D representation.

7. The confidence estimation system of claim 1 wherein the at least one attention module is pretrained on a text corpus.

8. The confidence estimation system of claim 7 wherein the pretraining includes pretraining for masked language modeling.

9. The confidence estimation system of claim 8 wherein the pretraining for masked language modeling is based on minimizing a cross-entropy loss.

10. The confidence estimation system of claim 7 wherein the pretraining further includes pretraining for next sentence prediction.

11. The confidence estimation system of claim 10 wherein the pretraining for next sentence prediction is based on minimizing a binary cross-entropy loss.

12. The confidence estimation system of claim 1 further comprising a transceiver configured to:
   receive the input sequence of words from a computing device via a network; and
   transmit, to the computing device via the network, the word that is obscured and the confidence value.

13. The confidence estimation system of claim 12 further comprising the computing device, wherein the computing device is configured to at least one of:

display the word that is obscured on a display; and
audibly output the word that is obscured via a speaker.

14. The confidence estimation system of claim 1 wherein the confidence module is configured to determine the confidence value based on whether the word determined by the at least one attention module is within a top k number of words, where k is an integer greater than zero.

15. The confidence estimation system of claim 1 further comprising a training module configured to train the at least one attention module based on the confidence value.

16. The confidence estimation system of claim 15 wherein the training includes selectively adjusting one or more parameter values of the at least one attention module.

17. The confidence estimation system of claim 1 wherein (i) the input sequence of words is a question, (ii) the word that is obscured is an answer to the question, and (iii) the probability of the at least one attention module correctly determining the word that is obscured is a determination indicating whether the answer to the question is correct.

18. A confidence estimation system, comprising:
a neural network trained for performing a natural language processing task,
the neural network including at least one attention module including N heads configured to process an input sequence of words received by the neural network in accordance with the natural language processing task thereby producing an output sequence,
the processing generating attention matrices based on interactions between tokens for the words in the input sequence of words; and
a confidence module configured to determine a confidence value indicative of a probability of the neural network correctly performing the natural language processing task,
the confidence module determining the confidence value of the natural language processing task using a convolutional neural network that projects the attention matrices generated by the at least one attention module over a multi-dimensional space,
the attention matrices recording interactions between the tokens in the input sequence of words without information regarding the tokens for the words and without information regarding the output sequence.

19. The confidence estimation system of claim 18 wherein the natural language processing task is one of: fact checking, translation, question-answering, summarization, sequence classification, sequence tagging, and text prediction.

20. A confidence estimation method, comprising:
generating attention matrices based on interactions between tokens for words in an input sequence of words received by a neural network,
the input sequence of words including a word that is obscured;
determining the word that is obscured in the input sequence;
determining a confidence value indicative of a probability of that the determination of the word that is obscured is correct; and
the determining the confidence value being performed using a convolutional neural network that projects the attention matrices over a multi-dimensional space,
the attention matrices recording interactions between the tokens in the input sequence of words without information regarding the tokens for the words and without information regarding the word that is obscured.

* * * * *